US010225396B2

(12) United States Patent
Hodge

(10) Patent No.: US 10,225,396 B2
(45) Date of Patent: *Mar. 5, 2019

(54) THIRD PARTY MONITORING OF A ACTIVITY WITHIN A MONITORING PLATFORM

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,598

(22) Filed: Jun. 1, 2017

(65) Prior Publication Data

US 2018/0338036 A1 Nov. 22, 2018

Related U.S. Application Data

(60) Provisional application No. 62/508,106, filed on May 18, 2017.

(51) Int. Cl.
*H04M 3/00* (2006.01)
*H04M 3/08* (2006.01)
(Continued)

(52) U.S. Cl.
CPC .......... *H04M 3/2281* (2013.01); *H04L 67/22* (2013.01)

(58) Field of Classification Search
CPC ......... B01J 20/103; B01J 23/16; B63B 25/08; B63B 25/24; C01B 3/16; G06F 21/6218; G06F 2221/2149; H04L 63/10
(Continued)

(56) References Cited

U.S. PATENT DOCUMENTS 4,054,756 A 10/1977 Cornella et al.
4,191,860 A 3/1980 Weber
(Continued)

FOREIGN PATENT DOCUMENTS

EP 1280137 B1 12/2004
EP 2579676 A1 4/2013
(Continued)

OTHER PUBLICATIONS

Defendant's Responsive Claim Construction Brief, *Global Tel*Link Corporation v. Securus Technologies, Inc.*, Case No. 3:14-cv-0829-K (N.D. Tex.), filed Dec. 10, 2014.
(Continued)

*Primary Examiner* — Binh Kien Tieu
(74) *Attorney, Agent, or Firm* — Sterne, Kessler, Goldstein & Fox P.L.L.C.

(57) ABSTRACT

The present disclosure describes a monitoring environment that monitors an activity for activity that may be indicative of being prohibited by the local, the state, and/or the national governing authorities, namely suspicious activity, or activity that is prohibited by the local, the state, and/or the national governing authorities, namely prohibited activity. The monitoring environment verifies the activity is actually being monitored within the monitoring environment. The verification can require one or more monitoring persons monitoring the activity to perform one or more tasks to verify their attentiveness in monitoring the activity. The one or more tasks can be as simple as activating a checkbox or providing a code or an electronic signature to provide some examples, although more complicated tasks, such as a biometric verification such as a retinal, a facial, and/or a voice verification to provide some examples, are possible as will be recognized by those skilled in the relevant art(s)
(Continued)

without departing from the spirit and scope of the present disclosure.

24 Claims, 4 Drawing Sheets

(51) Int. Cl.
    *H04M 3/22*          (2006.01)
    *H04M 1/24*          (2006.01)
    *H04L 29/08*         (2006.01)

(58) Field of Classification Search
    USPC .......... 379/1.03, 32.01, 48, 49, 88.11, 88.12,
                      379/88.17, 88.22, 93.01, 93.07, 133,
                      379/265.01, 265.05, 265.06, 188, 200,
                                 379/249; 370/259, 352
    See application file for complete search history.

(56) References Cited

U.S. PATENT DOCUMENTS

| | | |
|---|---|---|
| 4,670,628 A | 6/1987 | Boratgis et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,485,507 A | 1/1996 | Brown et al. |
| 5,502,762 A | 3/1996 | Andrew et al. |
| 5,517,555 A | 5/1996 | Amadon et al. |
| 5,535,194 A | 7/1996 | Brown et al. |
| 5,535,261 A | 7/1996 | Brown et al. |
| 5,539,731 A | 7/1996 | Haneda et al. |
| 5,539,812 A | 7/1996 | Kitchin et al. |
| 5,544,649 A * | 8/1996 | David ................ A61B 5/6887 600/301 |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Greenberg |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Seraphim et al. |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,923,746 A | 7/1999 | Baker et al. |
| 5,926,533 A | 7/1999 | Gainsboro |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,211,783 B1 * | 4/2001 | Wang ................ G08B 21/0415 340/506 |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocionek et al. |
| 6,308,171 B1 | 10/2001 | De La Huerga |
| 6,312,911 B1 | 11/2001 | Bancroft |
| 6,314,192 B1 | 11/2001 | Chen et al. |
| 6,324,573 B1 | 11/2001 | Rhoads |

(56) References Cited

U.S. PATENT DOCUMENTS

| | | |
|---|---|---|
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,611,583 B1 | 8/2003 | Gainsboro |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 | 12/2003 | Schwartz et al. |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 | 3/2007 | Pettay |
| 7,197,560 B2 | 3/2007 | Caslin et al. |
| 7,236,932 B1 | 6/2007 | Grajski |
| 7,248,685 B2 | 7/2007 | Martin |
| 7,256,816 B2 | 8/2007 | Profanchik et al. |
| 7,277,468 B2 | 10/2007 | Tian et al. |
| 7,280,816 B2 | 10/2007 | Fratti et al. |
| 7,324,637 B2 | 1/2008 | Brown et al. |
| 7,333,798 B2 | 2/2008 | Hodge |
| 7,366,782 B2 | 4/2008 | Chong et al. |
| 7,406,039 B2 | 7/2008 | Cherian et al. |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,551,732 B2 | 6/2009 | Anders |
| 7,596,498 B2 | 9/2009 | Basu et al. |
| 7,639,791 B2 | 12/2009 | Hodge |
| 7,664,243 B2 | 2/2010 | Martin |
| 7,672,845 B2 | 3/2010 | Beranek et al. |
| RE41,190 E * | 4/2010 | Darling ................ G08B 25/014 340/10.1 |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 * | 9/2010 | Keiser .................. H04L 51/066 379/114.2 |
| 7,826,604 B2 | 12/2010 | Martin |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,899,167 B1 | 3/2011 | Rae |
| 7,961,860 B1 | 6/2011 | McFarlen |
| 8,031,052 B2 | 10/2011 | Polozola |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,498,937 B1 | 7/2013 | Shipman, Jr. et al. |
| 8,509,390 B2 | 8/2013 | Harper |
| 8,577,003 B2 | 11/2013 | Rae |
| 8,630,726 B2 | 1/2014 | Hodge et al. |
| 8,731,934 B2 | 5/2014 | Olligschlaeger et al. |
| 8,886,663 B2 | 11/2014 | Gainsboro et al. |
| 8,917,848 B2 | 12/2014 | Torgersrud et al. |
| 8,929,525 B1 | 1/2015 | Edwards |
| 9,020,115 B2 | 4/2015 | Hangsleben |
| 9,043,813 B2 | 5/2015 | Hanna et al. |
| 9,077,680 B2 | 7/2015 | Harper |
| 9,094,500 B1 | 7/2015 | Edwards |
| 9,143,609 B2 | 9/2015 | Hodge |
| 9,232,051 B2 | 1/2016 | Torgersrud et al. |
| 9,307,386 B2 | 4/2016 | Hodge et al. |
| 9,396,320 B2 | 7/2016 | Lindemann |
| 9,552,417 B2 | 1/2017 | Olligschlaeger et al. |
| 9,609,121 B1 | 3/2017 | Hodge |
| 9,615,060 B1 * | 4/2017 | Hodge .................. H04N 7/155 |
| 9,621,504 B2 | 4/2017 | Torgersrud et al. |
| 9,674,340 B1 | 6/2017 | Hodge |
| 9,800,830 B2 | 10/2017 | Humphries |
| 9,923,936 B2 | 3/2018 | Hodge |
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0035514 A1 | 2/2003 | Kee |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0117280 A1 * | 6/2003 | Prehn ................ G08B 13/19656 340/540 |
| 2003/0126470 A1 | 7/2003 | Crites et al. |
| 2003/0174826 A1 | 9/2003 | Hesse |
| 2003/0190045 A1 | 10/2003 | Huberman et al. |

(56) References Cited

U.S. PATENT DOCUMENTS

| | | |
|---|---|---|
| 2004/0008828 A1 | 1/2004 | Coles et al. |
| 2004/0029564 A1 | 2/2004 | Hodge |
| 2004/0081296 A1 | 4/2004 | Brown et al. |
| 2004/0161086 A1 | 8/2004 | Buntin et al. |
| 2004/0169683 A1 | 9/2004 | Chiu et al. |
| 2004/0249650 A1 | 12/2004 | Freedman et al. |
| 2004/0252184 A1 | 12/2004 | Hesse et al. |
| 2004/0252447 A1 | 12/2004 | Hesse et al. |
| 2005/0010411 A1 | 1/2005 | Rigazio et al. |
| 2005/0027723 A1 | 2/2005 | Jones et al. |
| 2005/0080625 A1 | 4/2005 | Bennett et al. |
| 2005/0094794 A1 | 5/2005 | Creamer et al. |
| 2005/0102371 A1 | 5/2005 | Aksu |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141678 A1 | 6/2005 | Anders et al. |
| 2005/0144004 A1 | 6/2005 | Bennett et al. |
| 2005/0170818 A1 | 8/2005 | Netanel et al. |
| 2005/0182628 A1 | 8/2005 | Choi |
| 2005/0207357 A1 | 9/2005 | Koga |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0093099 A1 | 5/2006 | Cho |
| 2006/0198504 A1 | 9/2006 | Shemisa et al. |
| 2006/0200353 A1 | 9/2006 | Bennett |
| 2006/0285650 A1 | 12/2006 | Hodge |
| 2006/0285665 A1 | 12/2006 | Wasserblat et al. |
| 2007/0003026 A1 | 1/2007 | Hodge et al. |
| 2007/0011008 A1 | 1/2007 | Scarano et al. |
| 2007/0041545 A1 | 2/2007 | Gainsboro |
| 2007/0047734 A1 | 3/2007 | Frost |
| 2007/0071206 A1 | 3/2007 | Gainsboro et al. |
| 2007/0133437 A1 | 6/2007 | Wengrovitz et al. |
| 2007/0185717 A1 | 8/2007 | Bennett |
| 2007/0192174 A1* | 8/2007 | Bischoff ............. G06F 19/3418 340/573.1 |
| 2007/0195703 A1 | 8/2007 | Boyajian et al. |
| 2007/0237099 A1 | 10/2007 | He et al. |
| 2007/0244690 A1 | 10/2007 | Peters |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0096178 A1 | 4/2008 | Rogers et al. |
| 2008/0106370 A1 | 5/2008 | Perez et al. |
| 2008/0118045 A1 | 5/2008 | Polozola et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |
| 2008/0201158 A1 | 8/2008 | Johnson et al. |
| 2008/0260133 A1 | 10/2008 | Hodge et al. |
| 2008/0300878 A1 | 12/2008 | Bennett |
| 2010/0177881 A1 | 7/2010 | Hodge |
| 2010/0202595 A1 | 8/2010 | Hodge et al. |
| 2010/0299761 A1 | 11/2010 | Shapiro |
| 2011/0055256 A1 | 3/2011 | Phillips et al. |
| 2011/0244440 A1 | 10/2011 | Saxon et al. |
| 2011/0279228 A1 | 11/2011 | Kumar et al. |
| 2012/0262271 A1 | 10/2012 | Torgersrud et al. |
| 2013/0104246 A1* | 4/2013 | Bear ..................... H04L 63/10 726/28 |
| 2013/0124192 A1* | 5/2013 | Lindmark ............. G06F 17/274 704/9 |
| 2013/0179949 A1 | 7/2013 | Shapiro |
| 2014/0247926 A1 | 9/2014 | Gainsboro et al. |
| 2014/0273929 A1 | 9/2014 | Togersrud |
| 2014/0287715 A1 | 9/2014 | Hodge et al. |
| 2014/0313275 A1 | 10/2014 | Gupta et al. |
| 2014/0334610 A1 | 11/2014 | Hangsleben |
| 2015/0051893 A1* | 2/2015 | Ratcliffe, III ...... G09B 19/0053 703/13 |
| 2015/0206417 A1 | 7/2015 | Bush |
| 2015/0215254 A1 | 7/2015 | Bennett |
| 2015/0221151 A1 | 8/2015 | Bacco et al. |
| 2015/0281431 A1* | 10/2015 | Gainsboro .......... H04M 3/2281 379/189 |
| 2015/0281433 A1 | 10/2015 | Gainsboro et al. |
| 2016/0191484 A1 | 6/2016 | Gongaware |
| 2016/0224538 A1 | 8/2016 | Chandrasekar et al. |
| 2016/0239932 A1* | 8/2016 | Sidler ................... H04L 63/302 |
| 2016/0301728 A1 | 10/2016 | Keiser et al. |
| 2016/0371756 A1* | 12/2016 | Yokel ................ G06Q 30/0613 |
| 2016/0373909 A1 | 12/2016 | Rasmussen |
| 2017/0270627 A1 | 9/2017 | Hodge |
| 2017/0295212 A1 | 10/2017 | Hodge |

FOREIGN PATENT DOCUMENTS

| | | |
|---|---|---|
| GB | 2075313 | 11/1981 |
| JP | 59225626 | 12/1984 |
| JP | 60010821 | 1/1985 |
| JP | 61135239 | 6/1986 |
| JP | 3065826 | 3/1991 |
| WO | WO 96/14703 A1 | 11/1995 |
| WO | WO 98/13993 A1 | 4/1998 |
| WO | WO 2001/074042 A2 | 10/2001 |
| WO | WO 2016/028864 A1 | 2/2016 |

OTHER PUBLICATIONS

Definition of "call data", Newton's Telecom Dictionary, 21st edition, San Francisco: CMP Books, 2005; p. 150.

Excerpts from the Prosecution History of U.S. Pat. No. 7,899,167, U.S. Appl. No. 10/642,532, filed Aug. 15, 2003.

File History of U.S. Appl. No. 12/861,322, filed Aug. 23, 2010.

File History of U.S. Pat. No. 9,143,609, U.S. Appl. No. 13/949,980, filed Jul. 24, 2013.

Intel® NetStructure High-Density Station Interface (HDSI) Boards Archived Webpage, Intel Corporation, 2003; 2 pages.

Joint Claim Construction and Prehearing Statement, Exhibit B: Securus' Intrinsic and Extrinsic Evidence Charts, *Global Tel\*Link Corporation v. Securus Technologies, Inc.*, No. 3:14-cv-00829-K (N.D. Tex.), Sep. 26, 2014.

Parties' Proposed Claim Constructions in *Global Tel\*Link Corporation v. Securus Technologies, Inc.*, No. 3:14-cv-00829-K (N.D. Tex.), filed Sep. 26, 2014; 17 pages.

Plaintiff's Opening Claim Construction Brief, *Global Tel\*Link Corporation v. Securus Technologies, Inc.*, Case No. 3:14-cv-0829-K (N.D. Tex.), filed Nov. 19, 2014.

Prosecution History of U.S. Appl. No. 11/045,589, filed Jan. 28, 2005.

Prosecution History of U.S. Appl. No. 12/002,507, filed Dec. 17, 2007.

Specification of U.S. Appl. No. 11/045,589, "Digital Telecommunications Call Management and Monitoring System," to Hodge, filed Jan. 28, 2005; 64 pages.

U.S. Appl. No. 60/607,447, "IP-based telephony system and method," to Apple, et al., filed Sep. 3, 2004.

Non-Final Rejection directed to U.S. Appl. No. 15/331,414, dated Jan. 13, 2017; 11 pages.

Notice of Allowance directed to U.S. Appl. No. 15/331,414, dated Apr. 11, 2017; 5 pages.

"Cisco IAD2400 Series Business-Class Integrated Access Device", Cisco Systems Datasheet, 2003; 8 pages.

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html; 5 pages.

"Hong Kong: Prison Conditions in 1997," Human Rights Watch, Mar. 1, 1997, C905, available at http://www.refworld.org/docid/3ae6a7d014.html, accessed May 29, 2014; 48 pages.

"PacketCableTM 1.0 Architecture Framework Technical Report", PKT-TR-ARCH-V0 1-001201 (Cable Television Laboratories, Inc. 1999).

"PacketCable™ Audio/Video Codecs Specification," Cable Television Laboratories, Inc., Serial No. PKT-SP-CODEC-105-040113 (2004).

(56) References Cited

OTHER PUBLICATIONS

"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N, 1957; 8 pages.
"SIP and IPLinkTM in the Next Generation Network: An Overview," Intel, 2001; 6 pages.
"The AutoEDMS Document Management and Workflow System: An Overview of Key Features, Functions and Capabilities," ACS Software, May 2003; 32 pages.
"Voice Over Packet in Next Generation Networks: An Architectural Framework," Bellcore, Special Report SR-4717, Issue 1, Jan. 1999; 288 pages.
"Cool Edit Pro, Version 1.2 User Guide," Syntrillium Software Corporation, 1998; 226 pages.
"Criminal Calls: A Review of the Bureau of Prisons' Management of Inmate Telephone Privileges," U.S. Department of Justice, Office of the Inspector General, Aug. 1999; 166 pages.
"Global Call API for Linux and Windows Operating Systems," Intel Dialogic Library Reference, Dec. 2005; 484 pages.
"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf; 9 pages.
Aggarwal, et al., "An Environment for Studying Switching System Software Architecture," IEEE, Global Telecommunications Conference, 1988; 7 pages.
Amendment and Response Under 37 C.F.R. §1.111 dated Sep. 30, 2011, in U.S. Appl. No. 11/706,431; 12 pages.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity," World Wide Web, 2014, accessible at http://wiki.audacity.team.org/wiki/About_Audacity; 3 pages.
Beek et al., "An Assessment of the Technology of Automatic Speech Recognition for Military Applications," IEEE Trans. Acoustics, Speech, and Signal Processing, vol. ASSP-25, No. 4, 1977; pp. 310-322.
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Speaker Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference, Nov. 4, 2005; 33 pages.
Beigi, H., "Decision Theory," Fundamentals of Speaker Recognition, Ch. 9, Springer, US 2011; pp. 313-339.
Bender, et al., "Techniques for Data Hiding," IBM Systems Journal, vol. 35, Nos. 3&4, 1996; 24 pages.
Boersma, et al., "Praat: Doing Phonetics by computer," World Wide Web, 2015, accessible at http://www.fon.hum.uva.nl/praat; 2 pages.
Bolton, et al., "Statistical Fraud Detection: A Review," Statistical Science, vol. 17, No. 3 (2002), pp. 235-255.
Boney, L., et al., "Digital Watermarks for Audio Signals" Proceedings of EUSIPCO-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480, IEEE Computer Society Press, United States (1996).
Bur Goode, Voice Over Internet Protocol (VoIP), Proceedings of the IEEE, vol. 90, No. 9, Sep. 2002; pp. 1495-1517.
Carey, et al., "User Validation for Mobile Telephones," International Conference on Acoustics, Speech, and Signal Processing (ICASSP), vol. 2, Jun. 2000, pp. 1093-1096.
Chau, et al., "Building an Infrastructure for Law Enforcement Information Sharing and Collaboration: Design Issues and Challenges," National Conference on Digital Government, 2001; 6 pages.
Chaudhari, et al., "Transformation enhanced multi-grained modeling for text-independent speaker recognition," International Conference on Spoken Language Processing, 2000, pp. 298-301.
Christel, et al., "Interactive Maps for a Digital Video Library," IEEE Special Edition on Multimedia Computing, Jan.-Mar. 2000, IEEE, United States; pp. 60-67.
Clavel, et al., "Events Detection for an Audio-Based Surveillance System," IEEE International Conference on Multimedia and Expo (ICME2005), Jul. 6-8, 2005, pp. 1306-1309.
Coden, et al., "Speech Transcript Analysis for Automatic Search," Proceedings of the 34th Hawaii International Conference on System Sciences, IEEE, 2001; 9 pages.
Coherent Announces Industry's First Remote Management System for Echo Canceller, Business Wire, Mar. 3, 1997; 3 pages.
Complaint for Patent Infringement, filed Aug. 1, 2013, *Securus Technologies, Inc.* v. *Global Tel*Link Corporation*, Case No. 3:13-cv-03009-K (N.D. Tex.); 9 pages.
Corbato, et al., "Introduction and Overview of the MULTICS System," Proceedings—Fall Joint Computer Conference, 1965; 12 pages.
Cox, et al.; "Secure Spread Spectrum Watermarking for Multimedia," NEC Research Institute, Technical Report 95-10, Dec. 1997; 34 pages.
Defendant's Opening Claim Construction Brief, *Global Tel*Link Corporation* v. *Securus Technologies, Inc.*, Case No. 3:14-cv-0829-K (N.D. Tex.), filed Nov. 19, 2014; 33 pages.
Definition of "constantly", The American Heritage Dictionary, 4th Ed. (2002); p. 306.
Definition of "logic", IEEE 100: The Authoritative Dictionary of IEEE Standard Terms, Seventh Edition, Standards Information Network, IEEE Press (2000).
Definition of "telephony", McGraw-Hill Dictionary of Scientific and Technical Terms, 6th Edition (McGraw-Hill, 2003); p. 2112.
Definitions of "Local Area Network (LAN)" and "Wide Area Network (WAN)," Microsoft Computer Dictionary (Microsoft Press 2002), pp. 304 and 561.
Definitions of "suspicion" and "suspect", American Heritage Dictionary, 4th Edition, New York: Houghton Mifflin, 2006; pp. 1743-1744.
Digital Copy of "Bellcore Notes on the Networks," Bellcore, Special Report SR-2275, Issue 3, Dec. 1997.
Doddington, G., "Speaker Recognition based on Idiolectal Differences between Speakers," 7th European Conference on Speech Communication and Technology, Sep. 3-7, 2001; 4 pages.
Dunn, et al., "Approaches to speaker detection and tracking in conversational speech," Digital Signal Processing, vol. 10, 2000; pp. 92-112.
Dye, Charles, "Oracle Distributed Systems," O'Reilly Media, Inc., Apr. 1, 1999; 29 pages.
Excerpts from IEEE 100: The Authoritative Dictionary of IEEE Standard Terms, Seventh Edition, Standards Information Network, IEEE Press (2000).
Excerpts from the Prosecution History of U.S. Appl. No. 10/135,878, filed Apr. 29, 2002.
File History of U.S. Pat. No. 8,135,115, U.S. Appl. No. 11/603,938, filed Nov. 22, 2006.
File History of U.S. Pat. No. 8,577,003, U.S. Appl. No. 13/009,483, filed Jan. 19, 2011.
File History of U.S. Pat. No. 8,886,663, U.S. Appl. No. 12/284,450, filed Sep. 20, 2008.
File History of U.S. Pat. No. 9,094,500, U.S. Appl. No. 14/322,869, filed Jul. 2, 2014.
Fischer, Alan D., "Coplink nabs criminals faster," Arizona Daily Star, Jan. 7, 2001; 5 pages.
Fleischman, E., "Advanced Streaming Format (ASF) Specification," Microsoft Corporation, Jan. 9, 1998; 78 pages.
Fox, B., "The First Amendment Rights of Prisoners," 63 J. Crim. L. Criminology & Police Sci. 162, 1972; 24 pages.
Frankel, F., Audioconferencing Options (Teleconferencing Units, Conference Bridges and Service Bureaus), Teleconnect, vol. 4, No. 5, p. 131(3), May 1996; 6 pages.
Furui, et al., "Experimental studies in a new automatic speaker verification system using telephone speech," Acoustics, Speech, and

(56) References Cited

OTHER PUBLICATIONS

Signal Processing, IEEE International Conference on ICASSP '80, vol. 5, Apr. 1980, pp. 1060-1062.

Furui, S., "50 Years of Progress in Speech and Speaker Recognition Research," ECTI Transactions on Computer and Information Technology, vol. 1, No. 2, Nov. 2005, pp. 64-74.

Hansen, et al., "Speaker recognition using phoneme-specific gmms," The Speaker and Language Recognition Workshop, May-Jun. 2004; 6 pages.

Hauck, et al., "Coplink: A Case of Intelligent Analysis and Knowledge Management," University of Arizona, 1999; 20 pages.

Hewett, et al., Signaling System No. 7 (SS7/C7): Protocol, Architecture, and Services (Networking Technology), Cisco Press, Jun. 2005; 8 pages.

i2 Investigative Analysis Software; "Chart Reader", URL: http://www.i2.co.uk/Products/Chart Reader. Jun. 13, 2005.

i2 Investigative Analysis Software; "i2 TextChart—Text Visualized", URL: http://www.i2.co.uk/Products/i2TextChart/. Jun. 13, 2005.

i2 Investigative Analysis Software; "iBase-Information Captured", URL: http://www.i2.co.uk/Products/iBase/. Jun. 13, 2005.

i2 Investigative Analysis Software; "iBridge", URL: http://www.i2.eo.uk/Products/iBridge/. Jun. 13, 2005.

i2 Investigative Analysis Software; "Pattern Tracer", URL: http://www.i2.co.uk/Products/Pattern Tracer. Jun. 13, 2005.

i2 Investigative Analysis Software; "Prisons", URL: http://www.i2.co.uk/Solutions/Prisons/default.aso. Jun. 13, 2005.

i2 Investigative Analysis Software; "Setting International Standards for Investigative Analysis", URL: http://www.i2.co.uk/Products/index.htm. Jun. 13, 2005.

IMAGIS Technologies, Inc. "Computer Arrest and Booking System", [retrieved from http://www.imagistechnologies.com/Product/CABS.htm] (Nov. 5, 2002) 5 pages.

IMAGIS Technologies, Inc. "Integrated Justice System—Web-based Image and Data Sharing" [retrieved from http://www.imagistechnologies.com/Product/IJISFramework.htm>] (Nov. 5, 2002) 4 pages.

Inmate Telephone Services: Large Business: Voice, Oct. 2, 2001; 3 pages.

International Search Report and Written Opinion directed to International Application No. PCT/US2017/022169, dated May 29, 2017; 57 pages.

International Search Report for International Application No. PCT/US04/025029, European Patent Office, Netherlands, dated Mar. 14, 2006.

Isobe, et al., "A new cohort normalization using local acoustic information for speaker verification," Proceedings of the IEEE International Conference on Acoustics, Speech, and Signal Processing, vol. 2, Mar. 1999; pp. 841-844.

Juang, et al., "Automatic Speech Recognition—A Brief History of the Technology Development," Oct. 8, 2014; 24 pages.

Kinnunen, et al., "Real-Time Speaker Identification and Verification," IEEE Transactions on Audio, Speech, and Language Processing, vol. 14, No. 1, Jan. 2006, pp. 277-288.

Knox, "The Problem of Gangs and Security Threat Groups (STG's) in American Prisons Today: Recent Research Findings From the 2004 Prison Gang Survey," National Gang Crime Research Center, 2005; 67 pages.

Kozamernik, F., "Media Streaming over the Internet—an overview of delivery technologies," EBU Technical Review, Oct. 2002; 15 pages.

Lane, et al., Language Model Switching Based on Topic Detection for Dialog Speech Recognition, Proceedings of the IEEE-ICASSP, vol. 1, 2003, IEEE; pp. 616-619.

Maes, et al., "Conversational speech biometrics," E-Commerce Agents, Marketplace Solutions, Security Issues, and Supply and Demand, Springer-Verlang, London, UK, 2001, pp. 166-179.

Maes, et al., "Open SESAME! Speech, Password or Key to Secure Your Door?," Asian Conference on Computer Vision, Jan. 1998; pp. 1-3.

Matsui, et al., "Concatenated Phoneme Models for Text-Variable Speaker Recognition," International Conference on Acoustics, Speech, and Signal Processing (ICASSP), vol. 2, Apr. 1993; pp. 391-394.

McCollum, "Federal Prisoner Health Care Copayment Act of 2000," House of Representatives Report 106-851, 106th Congress 2d Session, Sep. 14, 2000; 22 pages.

*Microsoft Computer Dictionary*, Fifth Edition, Microsoft Computer Press: Redmond, WA, 2002; 652 pages.

Microsoft White Paper: "Integrated Justice Information Systems", retrieved from Microsoft Justice & Public Safety Solutions (Nov. 5, 2002) [http://jps.directtaps.net_vti bin/owssvr.dll?Using=Default%2ehtm]; 22 pages.

Moattar, et al., "Speech Overlap Detection using Spectral Features and its Application in Speech Indexing," 2nd International Conference on Information & Communication Technologies, 2006; pp. 1270-1274.

National Alliance of Gang Investigators Associations, 2005 National Gang Threat Assessment, 2005, Bureau of Justice Assistance, Office of Justice Programs, U.S. Department of Justice; 73 pages.

National Major Gang Taskforce, "A Study of Gangs and Security Threat Groups in America's Adult Prisons and Jails," 2002; 38 pages.

Navratil, et al., "A Speech Biometrics System With MultiGrained Speaker Modeling," 2000; 5 pages.

Navratil, et al., "Phonetic speaker recognition using maximum-likelihood binary-decision tree models," Proceedings of the IEEE International Conference on Acoustics, Speech, and Signal Processing, Apr. 6-10, 2003; 4 pages.

Newton's Telecom Dictionary, 18th Edition, Feb. 2002; p. 655.

Newton's Telecom Dictionary, 18th Edition, Feb. 2002; p. 168.

Office Action dated Dec. 1, 2011, in Canadian Patent Application No. 2,534,767, DSI-ITI, LLC, filed Aug. 4, 2004.

O'Harrow, R. "U.S. Backs Florida's New Counterterrorism Database; 'Matrix' Offers Law Agencies Faster Access to Americans' Personal Records"; The Washington Post. Washington, D.C., Aug. 6, 2003; p. A 01.

O'Harrow, R.. "Database will make tracking suspected terrorists easier", The Dallas Morning News. Dallas, TX, Aug. 6, 2003; p. 7A.

Olligschlaeger, A. M., "Criminal Intelligence Databases and Applications," in Marilyn B. Peterson, Bob Morehouse, and Richard Wright, Intelligence 2000: Revising the Basic Elements—A Guide for Intelligence Professionals, Mar. 30, 2000 a joint publication of IALEIA and LEIU; 53 pages.

Original Specification as-filed Aug. 26, 2005, in U.S. Appl. No. 11/212,495 to Frost.

Original Specification as-filed Jul. 22, 2005, in U.S. Appl. No. 11/187,423 to Shaffer.

Osifchin, N., "A Telecommunications Buildings/Power Infrastructure in a New Era of Public Networking," IEEE 2000; 7 pages.

Pages from http://www.corp.att.com/history, archived by web.archive.org on Nov. 4, 2013.

Pelecanos, J. "Conversational biometrics," in Biometric Consortium Meeting, Baltimore, MD, Sep. 2006, accessible at http://www.biometrics.org/bc2006/presentations/Thu_Sep_21/Session_1/Pelecanos_Conversational_Biometrics.pdf; 14 pages.

Pollack, et al., "On the Identification of Speakers by Voice," The Journal of the Acoustical Society of America, vol. 26, No. 3, May 1954; 4 pages.

Prosecution History of International Patent Application No. PCT/US99/09493 by Brown et al., filed Apr. 29, 1999.

Prosecution History of U.S. Appl. No. 09/072,436, filed May 4, 1998.

Prosecution History of U.S. Appl. No. 11/005,816, filed Dec. 7, 2004.

Prosecution History of U.S. Appl. No. 11/182,625, filed Jul. 15, 2005.

Prosecution History of U.S. Appl. No. 11/479,990, filed Jun. 30, 2006.

Prosecution History of U.S. Appl. No. 11/480,258, filed Jun. 30, 2006.

Prosecution History of U.S. Appl. No. 11/609,397, filed Dec. 12, 2006.

(56) References Cited

OTHER PUBLICATIONS

Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983; 884 pages.
Reynolds, D., "Automatic Speaker Recognition Using Gaussian Mixture Speaker Models," The Lincoln Laboratory Journal, vol. 8, No. 2, 1995; pp. 173-192.
Rosenberg, et al., "SIP: Session Initial Protocol," Network Working Group, Standard Track, Jun. 2002; 269 pages.
Rosenberg, et al., "The Use of Cohort Normalized Scores for Speaker Verification," Speech Research Department, AT&T Bell Laboratories, 2nd International Conference on Spoken Language Processing, Oct. 12-16, 1992; 4 pages.
Ross, et al., "Multimodal Biometrics: An Overview," Proc. of 12th European Signal Processing Conference (EUSIPCO), Sep. 2004; pp. 1221-1224.
Science Dynamics, BubbleLINK Software Architecture, 2003; 10 pages.
Science Dynamics, Commander Call Control System, Rev. 1.04, 2002; 16 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959; 10 pages.
Silberg, L., Digital on Call, HFN The Weekly Newspaper for the Home Furnishing Network, Mar. 17, 1997; 4 pages.
Silberschatz, et al., Operating System Concepts, Third Edition, Addison-Wesley: Reading, MA, Sep. 1991; 700 pages.
Simmons, R., "Why 2007 is Not Like 1984: A Broader Perspective on Technology's Effect on Privacy and Fourth Amendment Jurisprudence," J. Crim. L. & Criminology vol. 97, No. 2, Winter 2007; 39 pages.
Smith, M., "Corrections Turns Over a New LEAF: Correctional Agencies Receive Assistance From the Law Enforcement Analysis Facility," Corrections Today, Oct. 1, 2001; 4 pages.
Specification of U.S. Appl. No. 10/720,848, "Information Management and Movement System and Method," to Viola, et al., filed Nov. 24, 2003.
State of North Carolina Department of Correction RFP #ITS-000938A, issued May 25, 2004; 8 pages.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Sundstrom, K., "Voice over IP: An Engineering Analysis," Master's Thesis, Department of Electrical and Computer Engineering, University of Manitoba, Sep. 1999; 140 pages.
Supplementary European Search Report for EP Application No. EP 04 80 9530, Munich, Germany, completed on Mar. 25, 2009.
Tanenbaum, A., *Modern Operating Systems*, Third Edition, Peason Prentice Hall: London, 2009; 552 pages.
Tirkel, A., et al.; "Image Watermarking—A Spread Spectrum Application," Sep. 22-25, 1996; 7 pages.
Viswanathan, et al., "Multimedia Document Retrieval using Speech and Speaker Recognition," International Journal on Document Analysis and Recognition, Jun. 2000, vol. 2; pp. 1-24.
Walden, R., "Performance Trends for Analog-to-Digital Converters," IEEE Communications Magazine, Feb. 1999.
Weinstein, C., MIT, The Experimental Integrated Switched Network—A System-Level Network Test Facility, IEEE 1983; 8 pages.
Wilkinson, Reginald A., "Visiting in Prison," Prison and Jail Administration's Practices and Theory, 1999; 7 pages.
Wenterdyk et al., "Managing Prison Gangs," Journal of Criminal Justice, vol. 38, 2010; pp. 730-736.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.
International Search Report and Written Opinion of the International Searching Authority directed to related International Application No. PCT/US2017/026570, dated May 8, 2017; 7 pages.

\* cited by examiner

THIRD PARTY MONITORING OF A ACTIVITY WITHIN A MONITORING PLATFORM

CROSS-REFERENCE TO RELATED APPLICATIONS

The present application claims the benefit of U.S. Provisional Patent Appl. No. 62/508,106, filed May 18, 2017, which is incorporated herein by reference in its entirety.

BACKGROUND

Related Art

Correctional facilities provide inmates with the ability to communicate with friends, families, and visitors as it improves recidivism and provides incentives for inmates to follow rules and policies of the facility. In addition to traditional telephone calls and telephone visitations, correctional facilities seek to offer a wide variety of communication services to inmates, such as video visitation and video calls, among others. However, as the amount of communication options available to inmates increases, an increased amount of monitoring is required for these communications.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
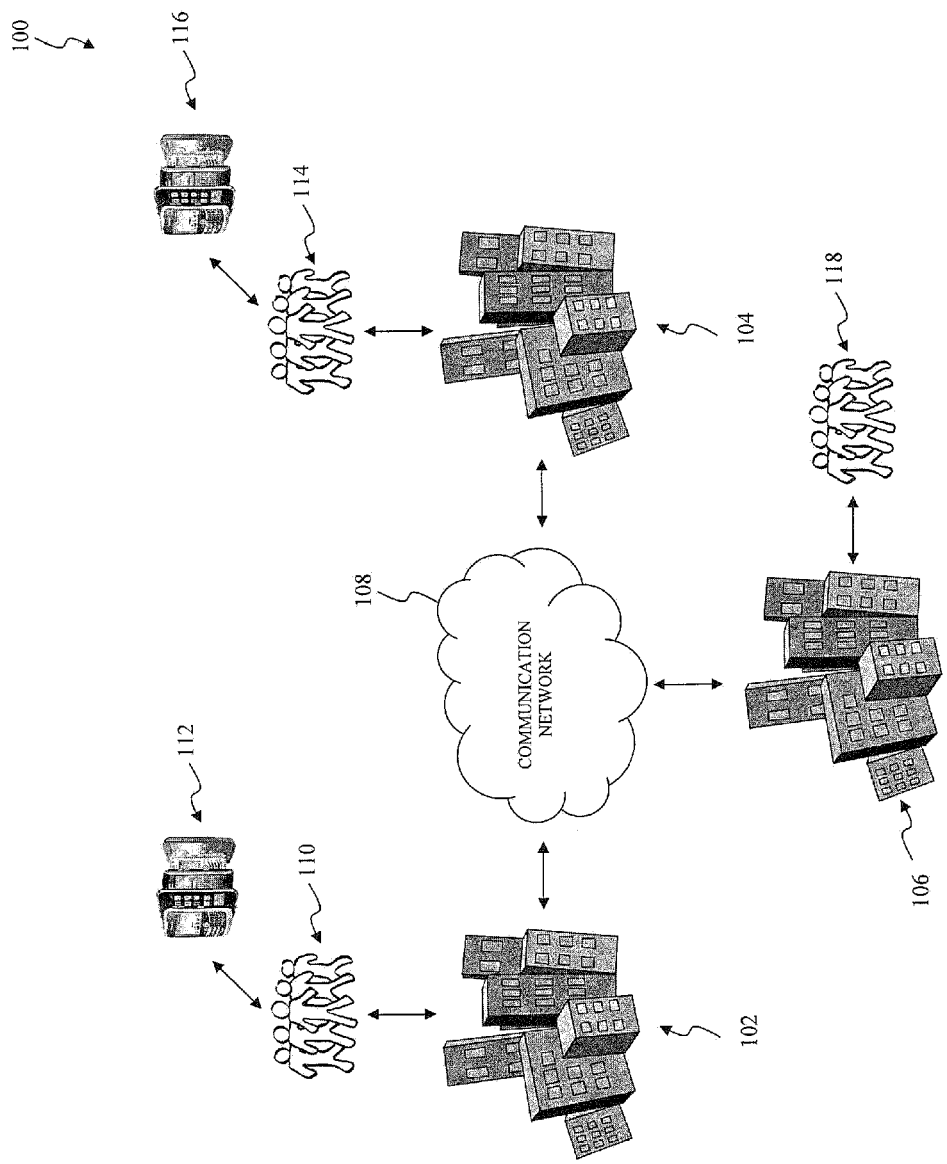
FIG. 1 illustrates an exemplary monitoring platform according to an exemplary embodiment of the present disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

Overview

The present disclosure describes a monitoring environment that monitors an activity for activity that may be indicative of being prohibited by the local, the state, and/or the national governing authorities, namely suspicious activity, or activity that is prohibited by the local, the state, and/or the national governing authorities, namely prohibited activity. The monitoring environment verifies the activity is actually being monitored within the monitoring environment. The verification can require one or more monitoring persons monitoring the activity to perform one or more tasks to verify their attentiveness in monitoring the activity. The one or more tasks can be as simple as activating a checkbox or providing a code or an electronic signature to provide some examples, although more complicated tasks, such as a biometric verification such as a retinal, a facial, and/or a voice verification to provide some examples, are possible as will be recognized by those skilled in the relevant art(s) without departing from the spirit and scope of the present disclosure.

Exemplary Monitoring Platform

FIG. 1 illustrates an exemplary monitoring platform according to an exemplary embodiment of the present disclosure. As illustrated in FIG. 1, a monitoring environment 100 monitors an activity for activity that may be indicative of being prohibited by the local, the state, and/or the national governing authorities, namely suspicious activity, or activity that is prohibited by the local, the state, and/or the national governing authorities, namely prohibited activity. Moreover, the monitoring environment 100 verifies the activity is actually being monitored within the monitoring environment 100. In the exemplary embodiment illustrated in FIG. 1, the monitoring environment 100 includes a controlled environment 102, an uncontrolled environment 104, and a monitoring platform 106 that are communicatively coupled to each other via a communication network 108. Although the controlled environment 102 is to be described in terms of an institutional environment, such as a local, a state, and/or a national prison, correctional facility, detention center, jail, penitentiary or remand center to provide some examples, those skilled in the relevant art(s) will recognize that the teachings described herein are equally applicable to any other suitable environment that is prescribed by the local, the state, and/or the national governing authorities without departing from a spirit and scope of the present disclosure. This other suitable environment can include a military environment, a hospital environment, an educational environment, a business environment, or a governmental environment to provide some examples.

The controlled environment 102 can be characterized as including one or more access restriction controls to control access to the controlled environment 102, access from the controlled environment 102, and/or access within the controlled environment 102. For example, the one or more access restriction controls can restrict entry by the general public into the controlled environment 102, can restrict those within the controlled environment 102 from leaving the controlled environment 102, and/or can restrict activity of those within the controlled environment 102. In some situations, the access restriction controls can be prescribed by the local, the state, and/or the national governing authorities.

As illustrated in FIG. 1, the controlled environment 102 can include one or more insider persons 110. The one or more insider persons 110 can include one or more persons occupying the controlled environment 102, such as one or more prisoners, inmates, or detainees to provide some examples, and/or one or more persons needed for operation of the controlled environment 102, such as one or more prison officers, corrections officers, correctional officers, detention officers, or penal officers to provide some examples. In some situations, the one or more insider persons 110 can access one or more insider communication devices 112 such as one or more mobile telephony devices, such as one or more mobile phones, one or more mobile computing devices; one or more mobile internet devices, such as one or more tablet computers and/or one or more laptop computers; one or more personal digital assistants; one or more handheld game consoles; one or more portable media players; one or more digital cameras; one or more pagers; one or more personal navigation devices; and/or other suitable communication devices that are capable of communication within the monitoring environment 100 that will be apparent to those skilled in the relevant art(s) without departing from the spirit and scope of the present disclosure. These other suitable communication devices can include one or more wired communication devices, such as one or more telephones, and/or one or more personal computing devices to provide some examples. In these situations, the one or more insider persons 110 can utilize the one or more insider communication devices 112 for communication, such as audio communication, video communication, and/or data communication to provide some examples, within the controlled environment 102 and/or between the controlled environment 102 and the uncontrolled environment 104.

Preferably, the uncontrolled environment 104 is situated in a location that is remote from the controlled environment 102, namely outside of the controlled environment 102, such that the uncontrolled environment 104 does not include the one or more access restriction controls of the controlled environment 102. For example, the general public is free to enter and/or to exit the uncontrolled environment 104 without being subject to the one or more access restriction controls of the controlled environment 102. However, those skilled in the relevant art(s) will recognize that the uncontrolled environment 104 can include other access restriction controls that can be prescribed by the local, the state, and/or the national governing authorities without departing from the spirit and scope of the present disclosure.

As additionally illustrated in FIG. 1, the uncontrolled environment 104 can include one or more outsider persons 114. In some situations, the one or more outsider persons 114 have access to one or more outsider communication devices 116 such as one or more mobile telephony devices, such as one or more mobile phones, one or more mobile computing devices, one or more mobile internet devices, such as one or more tablet computers and/or one or more laptop computers, one or more personal digital assistants, one or more handheld game consoles, one or more portable media players, one or more digital cameras, one or more pagers, one or more personal navigation devices, and/or other suitable communication devices that are capable of communication within the monitoring environment 100 that will be apparent to those skilled in the relevant art(s) without departing from the spirit and scope of the present disclosure. These other suitable communication devices can include one or more wired communication devices, such as one or more telephones, and/or one or more personal computing devices to provide some examples. In these situations, the one or more outsider persons 114 can utilize the one or more outsider communication devices 116 for communication, such as audio communication, video communication, and/or data communication to provide some examples, between the controlled environment 102 and the uncontrolled environment 104.

The monitoring platform 106 can operate in a monitor mode of operation or in a verification mode of operation. In an exemplary embodiment, the monitoring platform 106 can simultaneously operate in the monitor mode of operation or in the verification mode of operation; however, in some situations, the monitoring platform 106 can operate in the monitor mode of operation or in the verification mode of operation and can switch between the monitor mode of operation and the verification mode of operation when appropriate. In the monitoring mode of operation, the monitoring platform 106 monitors the activity within the monitoring environment 100. In the exemplary embodiment as illustrated in FIG. 1, the monitoring platform 106 is situated in a location that is remote from the controlled environment 102 and the uncontrolled environment 104, namely outside of the controlled environment 102 and the uncontrolled environment 104. However, in some situations, the monitoring platform 106 can be integrated within the controlled environment 102 or the uncontrolled environment 104.

In the monitoring mode of operation, the monitoring platform 106 monitors the activity within the monitoring environment 100 as it occurs in real-time, or near-time, or the activity within the monitoring environment 100 can be stored and monitored by the monitoring platform 106 after its occurrence. In an exemplary embodiment, the monitoring platform 106 can monitor less than all of the activity within the monitoring environment 100. In this exemplary embodiment, the specific number of activities to be monitored, for example a percentage of the activity within the monitoring environment 100, can be prescribed by the local, the state, and/or the national governing authorities or a contract between the monitoring platform 106 and the local, the state, and/or the national governing authorities can specify the specific number of activities. In this exemplary embodiment, the monitoring platform 106 can measure the specific number of activities monitored and/or verified to be monitored by the monitoring platform 106 to ensure the monitoring platform 106 is performing in accordance with regulations of the local, the state, and/or the national governing authorities and/or the contract between the monitoring platform 106 and the local, the state, and/or the national governing authorities. In some situations, payment to the monitoring platform 106 for monitoring the activity within the monitoring environment 100 can be based upon whether the monitoring platform 106 is performing in accordance with the regulations by the local, the state, and/or the national governing authorities and/or the contract between the monitoring platform 106 and the local, the state, and/or the national governing authorities.

Generally, the activity can include activity within the controlled environment 102 and/or activity between the controlled environment 102 and the uncontrolled environment 104. In an exemplary embodiment, the activity within the controlled environment 102 can include communication-related activity which relates to communication, such as audio communication, video communication, and/or data communication to provide some examples, among the one or more insider persons 110 within the controlled environment 102. This communication-related activity can include incoming telephone calls to the controlled environment 102, calls from informants to the controlled environment 102, inmate to inmate calling within the controlled environment 102, inmate to inmate electronic message relay within the controlled environment 102, electronic messaging, text messaging, video conferencing, or other real-time communication within the controlled environment 102, voicemail messaging, or other non-real-time communication, within the controlled environment 102, visitation within the controlled environment 102, teletypewriter (TTY), or other types of signaling, within the controlled environment 102, Internet browsing within the controlled environment 102, pre-incarceration communication within the controlled environment 102, post-incarceration communication within the controlled environment 102, chatbot interaction within the controlled environment 102, non-scheduled video communication within the controlled environment 102, covert audio and/or video communication within the controlled environment 102, and/or transcriptions of communication within the controlled environment 102 to provide some examples.

In another exemplary embodiment, the activity within the controlled environment 102 can additionally, or alternatively, include non-communication activity which typically involves observation of the one or more insider persons 110 within the controlled environment 102. For example, the non-communication activity within the controlled environment 102 can include movement of the one or more insider persons 110 within the controlled environment 102. In this example, the controlled environment 102 can include one or more security cameras to view and/or to record the movement of the one or more insider persons 110 within the controlled environment 102. Other non-communication activity within the controlled environment 102 that can be monitored by the monitoring platform 106 can include visitations between the one or more insider persons 110 and the one or more outsider persons 114 occurring within the controlled environment 102, exercising activity of the one or more insider persons 110 within the controlled environment 102, leisure time activity of the one or more insider persons 110 within the controlled environment 102, mealtime activity of the one or more insider persons 110 within the controlled environment 102, educational activity of the one or more insider persons 110 within the controlled environment 102, and/or employment activity of the one or more insider persons 110 within the controlled environment 102.

In a further exemplary embodiment, the activity between the controlled environment 102 and the uncontrolled environment 104 can further, or alternatively, include communication-related activity which relates to communication, such as audio communication, video communication, and/or data communication to provide some examples, between the one or more insider persons 110 and the one or more outsider persons 114. This communication-related activity can include telephone calls between the controlled environment 102 and the uncontrolled environment 104, electronic messaging, text messaging, video conferencing, or other real-time communication between the controlled environment 102 and the uncontrolled environment 104, voicemail messaging, or other non-real-time communication, between the controlled environment 102 and the uncontrolled environment 104, teletypewriter (TTY), or other types of signaling, between the controlled environment 102 and the uncontrolled environment 104, non-scheduled video communication between the controlled environment 102 and the uncontrolled environment, covert audio and/or video communication between the controlled environment 102 and the uncontrolled environment 104, and/or transcriptions of communication between the controlled environment 102 and the uncontrolled environment 104 to provide some examples.

As additionally illustrated in FIG. 1, the monitoring platform 106 can be utilized by one or more monitoring persons 118 to monitor the activity within the monitoring environment 100. Generally, the one or more monitoring persons 118 review the activity for the presence of the suspicious activity and/or the prohibited activity. Typically, the one or more monitoring persons 118 generate one or more warning alerts, such as an annotation, a flag, a bookmark, an audible alert, and/or a video alert to provide some examples, when the suspicious activity and/or the prohibited activity is present within the activity within the monitoring environment 100. The simplest warning alerts can include one or more annotations of the suspicious activity and/or the prohibited activity, although warning alerts of much greater complexity can be used, such notifying the local, the state, and/or the national governing authorities of the suspicious activity and/or the prohibited activity to provide an example, without departing from the spirit and scope of the present disclosure. In some situations, the generating of the one or more warning alerts can affect the activity within the monitoring environment 100. For example, communication between the one or more insider persons 110 and the one or more outsider persons 114 can be interrupted and/or disconnected upon the one or more monitoring persons 118 generating the one or more warning alerts. In an exemplary embodiment, the monitoring platform 106 can store a listing of warning alerts indexed to various actions to be performed by the monitoring platform 106. In this exemplary embodiment, the monitoring platform 106 can proceed with the action, such as annotating the suspicious activity and/or the prohibited activity, interrupting and/or disconnecting the communication between the one or more insider persons 110 and the one or more outsider persons 114, and/or notifying the local, the state, and/or the national governing authorities of the suspicious activity and/or the prohibited activity to provide some examples, corresponding with the one or more warning alerts as prescribed in the listing of warning alerts.

In the verification mode of operation, the monitoring platform 106 verifies the one or more monitoring persons 118 are monitoring, the activity within the monitoring environment 100. The monitoring platform 106 determines whether the one or more monitoring persons 118 are attentive and reviewing the activity. For example, when the one or more warning alerts are generated by the one or more monitoring persons 118 within a predetermined amount of time, such as once every minute, once every couple of minutes, once every hour, or once every couple of hours to provide some examples, the monitoring platform 106 presumes the one or more monitoring persons 118 are attentive and reviewing the activity. However, in some situations, no warning alerts may be generated by the one or more monitoring persons 118 when reviewing the activity within the predetermined amount of time. In these situations, the monitoring platform 106 can require the one or more monitoring persons 118 to perform one or more tasks to verify the one or more monitoring persons 118 are attentive and reviewing the activity. The one or more tasks can be as simple as activating a checkbox, entering a response to a question, or providing a code or an electronic signature to provide some examples, although more complicated tasks, such as a biometric verification such as a retinal, a facial, and/or a voice verification to provide some examples, are possible as will be recognized by those skilled in the relevant art(s) without departing from the spirit and scope of the present disclosure. In some situations, one or more pop-windows or dialog boxes can appear to the one or more monitoring persons 118 notifying the one or more monitoring persons 118 to perform the one or more tasks and/or entering information requested by one or more tasks to be performed by the monitoring persons 118 during the verification mode of operation.

The communication network 108 includes one or more wireless communication networks and/or one or more wired communication networks for communicatively coupling the controlled environment 102, the uncontrolled environment 104, and the monitoring platform 106. The one or more wireless communication networks can include one or more cellular phone networks, wireless local area networks (WLANs), wireless sensor networks, satellite communication networks, terrestrial microwave networks, and/or other suitable networks that transmit data over a wireless-based communication technology that will be apparent to those skilled in the relevant art(s) without departing from the spirit and scope of the present disclosure. The one or more wired communication networks include one or more telephone networks, cable television networks, internet access networks, fiber-optic communication networks and/or other suitable networks that transmit data over a wire-based communication technology that will be apparent to those skilled in the relevant art(s) without departing from the spirit and scope of the present disclosure.

Exemplary Monitoring Center of the Exemplary Monitoring Platform

Figure 2:
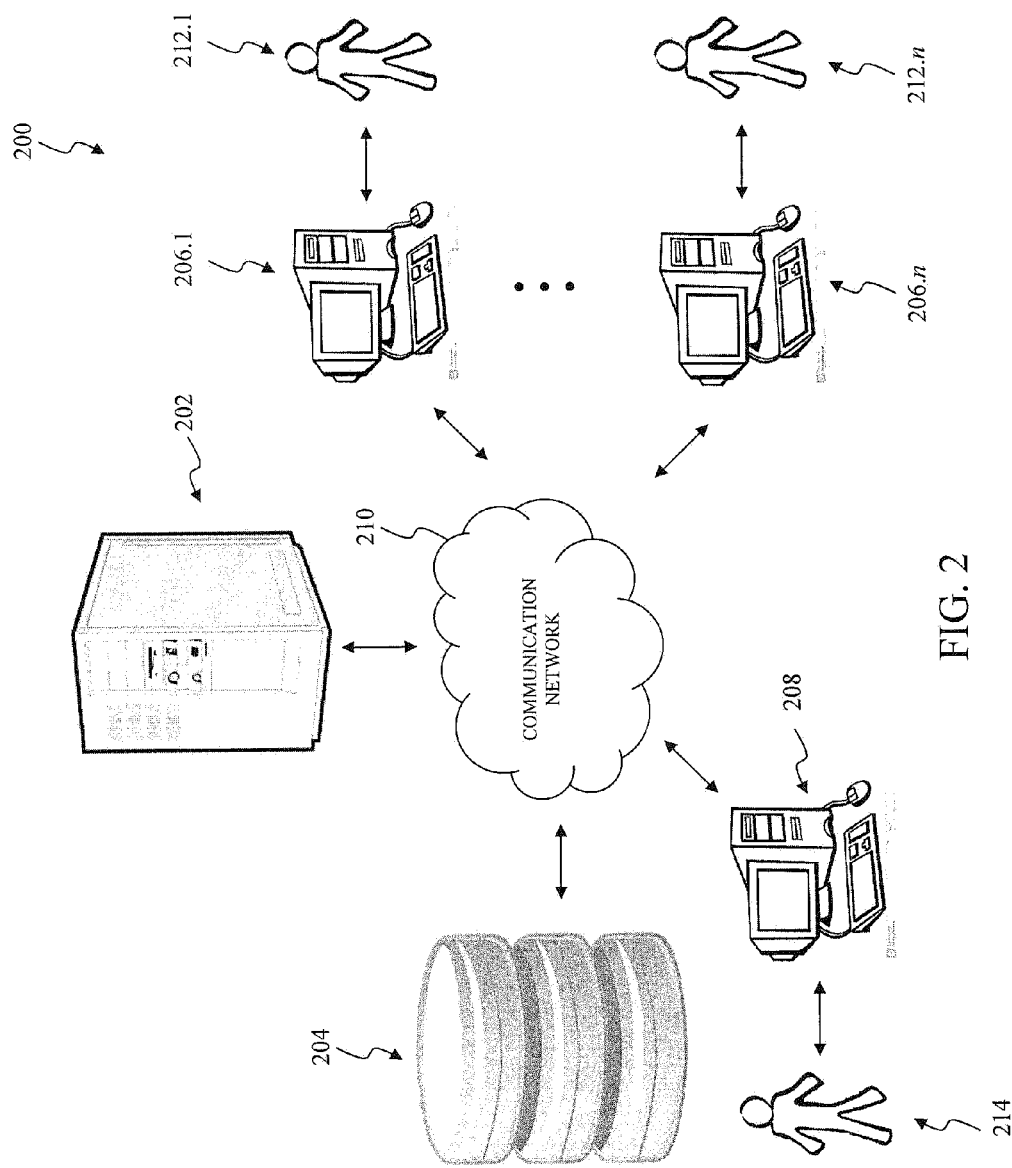
FIG. 2 illustrates an exemplary monitoring center of the exemplary monitoring platform according to an exemplary embodiment of the present disclosure.

FIG. 2 illustrates an exemplary monitoring center of the exemplary monitoring platform according to an exemplary embodiment of the present disclosure. A monitoring center 200 monitors the activity, as described above in FIG. 1, for the presence of the suspicious activity and/or the prohibited activity. Moreover, the monitoring center 200 verifies the activity is actually being monitored within the monitoring center 200. In the exemplary embodiment illustrated in FIG. 2, the monitoring center 200 includes a monitoring server 202, a monitoring storage 204, monitoring stations 206.1 through 206.n, and an administrative station 208 that are communicatively coupled to each other via a communication network 210. The monitoring center 200 can represent an exemplary embodiment of the monitoring platform 106.

Generally, the monitoring server 202 controls distribution of text, audio, and/or video information relating to the activity and/or scheduling of the monitoring stations 206.1 through 206.n, the administrative station 208, monitoring persons 212.1 through 212.n associated with the monitoring stations 206.1 through 206.n, and/or an administrative person 214 associated with the administrative station 208 to monitor the text, the audio, and/or the video information. In the exemplary embodiment illustrated in FIG. 2, the monitoring server 202 receives the text, the audio, and/or the video information. In some situations, the text, the audio, and/or the video information can include metadata describing the activity. This metadata can include the identification of persons within the activity and/or the date, the time, the duration, and/or the location of the activity to provide some examples. In an exemplary embodiment, this metadata can include a unique identifier for the text, the audio, and/or the video information corresponding to the activity to allow the activity to be easily tracked throughout the monitoring center 200.

The monitoring server 202 schedules the monitoring stations 206.1 through 206.n, the administrative station 208, the monitoring persons 212.1 through 212.n, and/or the administrative person 214 to review the text, the audio, and/or the video information. For example, the monitoring server 202 schedules the monitoring stations 206.1 through 206.n, the administrative station 208, the monitoring persons 212.1 through 212.n, and/or the administrative person 214 to review the text, the audio, and/or the video information in a round-robin manner. Typically, the round-robin manner sequentially cycles through the monitoring stations 206.1 through 206.n, the administrative station 208, the monitoring persons 212.1 through 212.n, and/or the administrative person 214 one after another; however, those skilled in the relevant art(s) will recognize that the round-robin manner may cycle through the monitoring stations 206.1 through 206.n, the administrative station 208, the monitoring persons 212.1 through 212.n, and/or the administrative person 214 in any suitable order without departing from the spirit and scope of the present disclosure.

As another example, the monitoring server 202 schedules the monitoring stations 206.1 through 206.n, the administrative station 208, the monitoring persons 212.1 through 212.n, and/or the administrative person 214 to review the text, the audio, and/or the video information based upon abilities of the monitoring stations 206.1 through 206.n, the administrative station 208, the monitoring persons 212.1 through 212.n, and/or the administrative person 214. In an exemplary embodiment, the abilities of the monitoring persons 212.1 through 212.n, and/or the administrative person 214 can be stored by the monitoring server 202 in one or more monitoring profiles which can be maintained by the administrative station 208. In this exemplary embodiment, the one or more monitoring profiles can also include the type of information, such as the text, the audio, and/or the video information, that the monitoring persons 212.1 through 212.n, and/or the administrative person 214 is permitted and/or certified to review. In this example, the monitoring server 202 can schedule one or more monitoring persons from among the monitoring persons 212.1 through 212.n and/or the administrative person 214 familiar with a particular language and/or custom when the text, the audio, and/or the video information can be characterized as being in the particular language and/or custom. Otherwise, or additionally, in this example, the monitoring server 202 can schedule the monitoring persons 212.1 through 212.n and/or the administrative person 214 based on scores or grades, which are to be described in further detail below, of the monitoring persons 212.1 through 212.n and/or the administrative person 214. In an exemplary embodiment, those monitoring persons from among the monitoring persons 212.1 through 212.n having higher scores or grades can be scheduled more often than those monitoring persons from among the monitoring persons 212.1 through 212.n having lower scores or grades. As a further example, the monitoring server 202 can schedule the monitoring stations 206.1 through 206.n, the administrative station 208, the monitoring persons 212.1 through 212.n, and/or the administrative person 214 based workloads of the monitoring stations 206.1 through 206.n, the administrative station 208, the monitoring persons 212.1 through 212.n, and/or the administrative person 214. In another exemplary embodiment, those monitoring stations and/or persons having higher workloads, for example, scheduled more frequently, can be scheduled less often than those monitoring stations and/or persons having lower workloads. In some situations, the monitoring server 202 can use a priority based scheduling when scheduling the monitoring stations 206.1 through 206.n, the administrative station 208, the monitoring persons 212.1 through 212.n, and/or the administrative person 214 to review the text, the audio, and/or the video information. In these situations, the monitoring server 202 schedules higher priority activity, such as real-time activity like electronic or text messages to provide some examples, to be reviewed sooner than lower priority activity such as non-real-time activity like voicemail messages to provide some examples.

In some situations, the monitoring server 202 can process the text, the audio, and/or the video information for automated review. In these situations, the monitoring server 202 automatically reviews the text, the audio, and/or the video information for the presence of the suspicious activity and/or the prohibited activity, such as call forwarding, three way calling, and/or dialing during communication to provide some examples, as described above in FIG. 1. Typically, the monitoring server 202 generates one or more automatic warning alerts, such as an annotation, a flag, a bookmark, an audible alert, and/or a video alert to provide some examples, when the text, the audio, and/or the video information include the suspicious activity and/or the prohibited activity as described above in FIG. 1. In an exemplary embodiment, the monitoring server 202 provides an indication to the monitoring stations 206.1 through 206.$n$, the administrative station 208, the monitoring persons 212.1 through 212.$n$, and/or the administrative person 214 when the monitoring server 202 generates the one or more automatic warning alerts. In another exemplary embodiment, the monitoring server 202 can send the text, the audio, and/or the video and the one or more automatic warning alerts, if generated, to the monitoring storage 204. In this other exemplary embodiment, the monitoring server 202 can time-stamp the one or more automatic warning alerts to correspond with the text, the audio, and/or the video information to allow the text, the audio, and/or the video information that caused the one or more automatic warning alerts to be easily reviewed at a later time.

In some situations, the monitoring server 202 converts the text, the audio, and/or the video information, into a format that is suitable for monitoring by the monitoring stations 206.1 through 206.$n$ and/or the administrative station 208. For example, the monitoring server 202 can transcribe the text, the audio, and/or the video information into other text, audio, and/or video information that is suitable for monitoring by the monitoring stations 206.1 through 206.$n$ and/or the administrative station 208. As an example of this transcription, the monitoring server 202 can transcribe audio information corresponding to an audio communication and/or video information corresponding to a video communication into text information. In this example, the transcription of the audio information and/or the video information into the text information allows the monitoring server 202 to automatically search the text information for one or more key words and/or key phrases from among a dictionary of key words and/or key phrases and to generate the one or more automatic warning alerts when the text information includes the one or more key words and/or key phrases.

In some situations, the monitoring server 202 can compress, decompress, encrypt and/or decrypt the text, the audio, and/or the video information in accordance with one or more compression algorithms and/or one or more encryption algorithms. The one or more compression algorithms can include any suitable lossless data compression algorithm and/or any suitable lossy data compression algorithm that will be apparent to those skilled in the relevant art(s) without departing from the spirit and scope of the present disclosure. The one or more encryption algorithms can include any suitable symmetric key algorithm, any suitable private key algorithm and/or any suitable public key algorithm that will be apparent to those skilled in the relevant art(s) without departing from the spirit and scope of the present disclosure.

The monitoring storage 204 stores the text, the audio, and/or the video information for review by the monitoring stations 206.1 through 206.$n$ as well as other data as to be described in further detail below. The monitoring storage 204 can include a read only memory (ROM), a random-access memory (RAM), a magnetic disk storage medium, a solid-state storage medium, an optical storage media, and/or a flash memory device to provide some examples for storing the text, the audio, and/or the video information.

The monitoring stations 206.1 through 206.$n$ can operate in the monitor mode of operation or in the verification mode of operation as described above in FIG. 1. Each of the monitoring stations 206.1 through 206.$n$ can be implemented as a mobile communication device such as a smartphone to provide an example, a desktop computer, a tablet computer, a personal digital assistant (PDA), or any other suitable electronic device capable of performing the functions of the monitoring stations 206.1 through 206.$n$ as described herein that will be apparent to those skilled in the relevant art(s) without departing from the spirit and scope of the present disclosure. In the monitoring mode of operation, the monitoring stations 206.1 through 206.$n$ retrieves the text, the audio, and/or the video information from the monitoring storage 204. However, in some situations, the monitoring stations 206.1 through 206.$n$ can retrieve the text, the audio, and/or the video information from the monitoring server 202. For example, the text, the audio, and/or the video information for higher priority activity, such as real-time activity like electronic or text messages to provide some examples, can be retrieved from the monitoring server 202, as opposed to the text, the audio, and/or the video information for lower priority activity such as non-real-time activity like voicemail messages to provide some examples, which can be retrieved from the monitoring storage 204. In an exemplary embodiment, each of the monitoring stations 206.1 through 206.$n$ can receive a monitoring schedule from the monitoring server 202 which includes a listing of the text, the audio, and/or the video information that the monitoring stations 206.1 through 206.$n$ and/or the monitoring persons 212.1 through 212.$n$ are scheduled to review. In this exemplary embodiment, the monitoring stations 206.1 through 206.$n$ retrieve the text, the audio, and/or the video information that the monitoring stations 206.1 through 206.$n$ and/or the monitoring persons 212.1 through 212.$n$ are scheduled to review in accordance with the monitoring schedule.

Thereafter, the monitoring stations 206.1 through 206.$n$ process the text, the audio, and/or the video information for review by the monitoring persons 212.1 through 212.$n$. Generally, the monitoring persons 212.1 through 212.$n$ review the text, the audio, and/or the video information that they are scheduled to review for the presence of the suspicious activity and/or the prohibited activity as described above in FIG. 1. In an exemplary embodiment, the monitoring stations 206.1 through 206.$n$ authenticate credentials, such as a username, a password, and/or an authentication code to provide some examples of the monitoring persons 212.1 through 212.$n$, before the monitoring persons 212.1 through 212.$n$ can access the monitoring stations 206.1 through 206.$n$ to review the text, the audio, and/or the video information that they are scheduled to review. In another exemplary, the monitoring stations 206.1 through 206.$n$ and/or the administrative station 208 can track review the text, the audio, and/or the video information by the monitoring persons 212.1 through 212.$n$. For example, the monitoring stations 206.1 through 206.$n$ and/or the administrative station 208 can track portions the text, the audio, and/or the video information that have been reviewed by the monitoring persons 212.1 through 212.$n$ and/or yet to be reviewed by the monitoring persons 212.1 through 212.$n$. Also, in this example, the monitoring stations 206.1 through 206.$n$ and/or the administrative station 208 can track which reviewer from among the monitoring persons 212.1 through 212.$n$ has reviewed the text, the audio, and/or the video information. Typically, the monitoring persons 212.1 through 212.$n$ generate one or more manual warning alerts, such as an annotation, a flag, a bookmark, an audible alert, and/or a video alert to provide some examples, when the text, the audio, and/or the video information includes the suspicious activity and/or the prohibited activity as described above in FIG. 1. In further exemplary embodiment, the monitoring stations 206.1 through 206.$n$ provide an indication to the monitoring server 202 and/or the administrative station 208 when the monitoring persons 212.1 through 212.n generate the one or more manual warning alerts. In a yet further exemplary embodiment, the monitoring stations 206.1 through 206.n can send the text, the audio, and/or the video and/or the one or more manual warning alerts, if generated, to the monitoring storage 204. In this yet further exemplary embodiment, the monitoring stations 206.1 through 206.n can time-stamp the one or more manual warning alerts to correspond with the text, the audio, and/or the video information to allow the text, the audio, and/or the video information that caused the one or more manual warning alerts to be easily reviewed at a later time. In some situations, the monitoring stations 206.1 through 206.n review the text, the audio, and/or the video information having the one or more manual automatic alerts generated by the monitoring server 202 to verify the presence of the suspicious activity and/or the prohibited activity within the text, the audio, and/or the video information.

Often times, the monitoring stations 206.1 through 206.n include one or more graphical user interfaces (GUIs) for interfacing with the monitoring persons 212.1 through 212.n. In an exemplary embodiment, the monitoring stations 206.1 through 206.n can display the text, the audio, and/or the video information using one or more graphical user interfaces (GUIs) to allow the text, the audio, and/or the video information to be monitored by the monitoring persons 212.1 through 212.n. In this exemplary embodiment, a first portion of the one or more GUIs includes one or more activity display areas for displaying the text, the audio, and/or the video information. This activity display area can include one or more activity display area controls allowing the monitoring persons 212.1 through 212.n to pause, stop, fast forward, rewind, and/or play the text, the audio, and/or the video information. The activity display area can also include one or more metadata display areas for displaying the metadata included within the text, the audio, and/or the video information and/or other data derived from the metadata included within the text, the audio, and/or the video information. Additionally, or alternatively, in this exemplary embodiment, a second portion of the one or more GUIs includes a warning alert area for generating the one or more manual warning alerts and/or for verifying the one or more automatic warning alerts. Further, or in the alternative, in this exemplary embodiment, one or more pop-windows or dialog boxes can appear to the monitoring persons 212.1 through 212.n notifying the monitoring persons 212.1 through 212.n to perform the one or more tasks and/or entering information requested by one or more tasks to be performed by the monitoring persons 212.1 through 212.n during the verification mode of operation as to be described in further detail below.

In the exemplary embodiment illustrated in FIG. 2, the monitoring server 202, the monitoring stations 206.1 through 206.n, and/or the administrative station 208 verifies the monitoring persons 212.1 through 212.n are monitoring the text, the audio, and/or the video information during the verification mode of operation. The monitoring server 202, the monitoring stations 206.1 through 206.n, and/or the administrative station 208 determines whether the monitoring persons 212.1 through 212.n are attentive and reviewing the activity. For example, when the one or more manual warning alerts are generated by the monitoring persons 212.1 through 212.n within a predetermined amount of time, such as once every minute, once every couple of minutes, once every hour, or once every couple of hours to provide some examples, the monitoring server 202, the monitoring stations 206.1 through 206.n, and/or the administrative station 208 presumes the monitoring persons 212.1 through 212.n are attentive and reviewing the activity. However, in some situations, no warning alerts may be generated by the monitoring persons 212.1 through 212.n when reviewing the activity within the predetermined amount of time. In these situations, the monitoring server 202, the monitoring stations 206.1 through 206.n, and/or the administrative station 208 can require the monitoring persons 212.1 through 212.n to perform the one or more tasks to verify the monitoring persons 212.1 through 212.n are attentive and reviewing the activity as described above in FIG. 1. As another example, the monitoring persons 212.1 through 212.n can be required to electrically certify, for example, by electronically signing, their monitoring of the text, the audio, and/or the video information after their review of the text, the audio, and/or the video information is complete. In this other example, the one or more GUIs, as described above, can include a textual box for entry of the electronically signatures of the monitoring persons 212.1 through 212.n. As a further example, the monitoring stations 206.1 through 206.n can include microphones and/or video cameras for recording audio and/or video of the monitoring persons 212.1 through 212.n while they are reviewing the text, the audio, and/or the video information. In this further example, the audio and/or the video of the monitoring persons 212.1 through 212.n can be stored in the monitoring storage 204 for access by the administrative station 208 to verify the monitoring persons 212.1 through 212.n are monitoring the text, the audio, and/or the video information.

The administrative station 208 and/or the administrative person 214 oversee operation of the monitoring center 200. Generally, the administrative person 214 can be characterized as being a root user, an administrator, an administrative user, or a supervisor user having more privileges than the monitoring persons 212.1 through 212.n. For example, the administrative person 214 can edit the one or more monitoring profiles of the monitoring persons 212.1 through 212.n, edit the one or more manual warning alerts, such as the annotation, the flag, the bookmark, the audible alert, and/or the video alert to provide some examples, generated by the monitoring persons 212.1 through 212.n, edit the monitoring schedule from the monitoring server 202, and/or edit the scores or grades of the monitoring persons 212.1 through 212.n.

The administrative station 208 can be implemented as a mobile communication device such as a smartphone to provide an example, a desktop computer, a tablet computers, a personal digital assistants (PDA), or any other suitable electronic device capable of performing the functions of the administrative station 208 as described herein that will be apparent to those skilled in the relevant art(s) without departing from the spirit and scope of the present disclosure. In an exemplary embodiment, the administrative station 208 can review the text, the audio, and/or the video information in a substantially similar manner as the monitoring stations 206.1 through 206.n.

In some situations, the administrative station 208 and/or the administrative person 214 receives a notification, such as a text message, an electronic mail message, or other electronic message, audible alert, video alert, from the monitoring stations 206.1 through 206.n when the one or more manual warning alerts have generated by the monitoring persons 212.1 through 212.n indicating further review of the text, the audio, and/or the video information. In these situations, the administrative station 208 can retrieve the text, the audio, and/or the video information and the one or more manual warning alerts from the storage monitoring storage 204.

Preferably in these situations, the administrative person 214 reviews the text, the audio, and/or the video information having the one or more manual warning alerts and/or the one or more automatic alerts to verify the presence of the suspicious activity and/or the prohibited activity within the text, the audio, and/or the video information. In an exemplary embodiment, the administrative station 208 authenticates credentials, such as a username, a password, and/or an authentication code to provide some examples of the administrative person 214, before the administrative person 214 can access the administrative station 208 to review the text, the audio, and/or the video information. In another exemplary embodiment, the administrative station 208 includes a substantially similar GUI as the monitoring stations 206.1 through 206.$n$ to allow the administrative person 214 to verify the suspicious activity and/or the prohibited activity within the text, the audio, and/or the video information. In some situations, the administrative station 208, as well as the monitoring stations 206.1 through 206.$n$, can affect the activity when the presence of the suspicious activity and/or the prohibited activity within the text, the audio, and/or the video information has been verified. For example, communication within the monitoring environment can be interrupted and/or disconnected upon verification of the presence of the suspicious activity and/or the prohibited activity. In an exemplary embodiment, the administrative station 208, as well as the monitoring stations 206.1 through 206.$n$, can store a listing of automatic and/or manual warning alerts which is indexed to various actions to be performed by the monitoring stations 206.1 through 206.$n$ and/or the administrative station 208. In this exemplary embodiment, the monitoring stations 206.1 through 206.$n$ and/or the administrative station 208 can proceed with the action, such as annotating the suspicious activity and/or the prohibited activity, interrupting and/or disconnecting the communication within the monitoring environment, and/or notifying the local, the state, and/or the national governing authorities of the suspicious activity and/or the prohibited activity to provide some examples, corresponding with the one or more automatic warning alerts and/or the one or more manual warning alerts as prescribed in the listing of warning alerts.

In the exemplary embodiment illustrated in FIG. 2, the administrative station 208 can utilize various statistical indicators to evaluate performance of the monitoring persons 212.1 through 212.$n$ and/or the administrative person 214. For example, these statistical indicators can include the number of the one or more manual warning alerts generated by the monitoring persons 212.1 through 212.$n$ and/or the administrative person 214 over a predetermined amount of time, for example, per activity, a day, a week, or a month, the number of the one or more manual warning alerts generated by the monitoring persons 212.1 through 212.$n$ and/or the administrative person 214 and verified by the administrative station 208 over a predetermined amount of time, for example, per activity, a day, a week, or a month, the number of activities that have been monitored by the monitoring persons 212.1 through 212.$n$ and/or the administrative person 214 over a predetermined amount of time, for example, a day, a week, or a month, and/or the number of times the monitoring persons 212.1 through 212.$n$ and/or the administrative person 214 have been required to perform the one or more tasks over a predetermined amount of time, for example, per activity, a day, a week, or a month. In this exemplary embodiment, the administrative station 208 can score or grade the monitoring persons 212.1 through 212.$n$ and/or the administrative person 214 based upon the various statistical indicators. For example, a first monitoring person from among the monitoring persons 212.1 through 212.$n$ can be scored or grader higher than a second monitoring person from among the monitoring persons 212.1 through 212.$n$ when the statistical indicators indicate the first monitoring person is more efficient, for example, more warning alerts generated by the first monitoring person over the predetermined amount of time, more warning alerts generated by the first monitoring person verified by the administrative station 208 over the predetermined amount of time, more activities have been monitored by the first monitoring person over the predetermined amount of time, and/or less tasks have been required to be performed by the first monitoring person, at monitoring the activity than the second monitoring person. Additionally, the administrative station 208 can measure the specific number of activities monitored and/or verified to be monitored the monitoring by the monitoring persons 212.1 through 212.$n$ and/or the administrative person 214 to ensure the monitoring center 200 is performing in accordance with the regulations by the local, the state, and/or the national governing authorities and/or the contract between the monitoring center 200 and the local, the state, and/or the national governing authorities as described above in FIG. 1. Further, the administrative station 208 can store a communication log indicating the activity that has been affected by the monitoring stations 206.1 through 206.$n$ and/or the administrative station 208 for including the suspicious activity and/or the prohibited activity. This communication log can be indexed to the persons within the activity and/or the date, the time, the duration, and/or the location of the activity to provide some examples to allow the text, the audio, and/or the video information to be correlated with other text, audio, and/or video information of other activities by the same persons, the same date, the same time, the same duration, and/or the same location.

The communication network 210 includes one or more wireless communication networks and/or one or more wired communication networks for communicatively coupling the monitoring server 202, the monitoring storage 204, the monitoring stations 206.1 through 206.$n$, and the administrative station 208. The one or more wireless communication networks can include one or more cellular phone networks, wireless local area networks (WLANs), wireless sensor networks, satellite communication networks, terrestrial microwave networks, and/or other suitable networks that transmit data over a wireless-based communication technology that will be apparent to those skilled in the relevant art(s) without departing from the spirit and scope of the present disclosure. The one or more wired communication networks include one or more telephone networks, cable television networks, internet access networks, fiber-optic communication networks and/or other suitable networks that transmit data over a wire-based communication technology that will be apparent to those skilled in the relevant art(s) without departing from the spirit and scope of the present disclosure.

Exemplary Operation of the Monitoring Center

Figure 3:
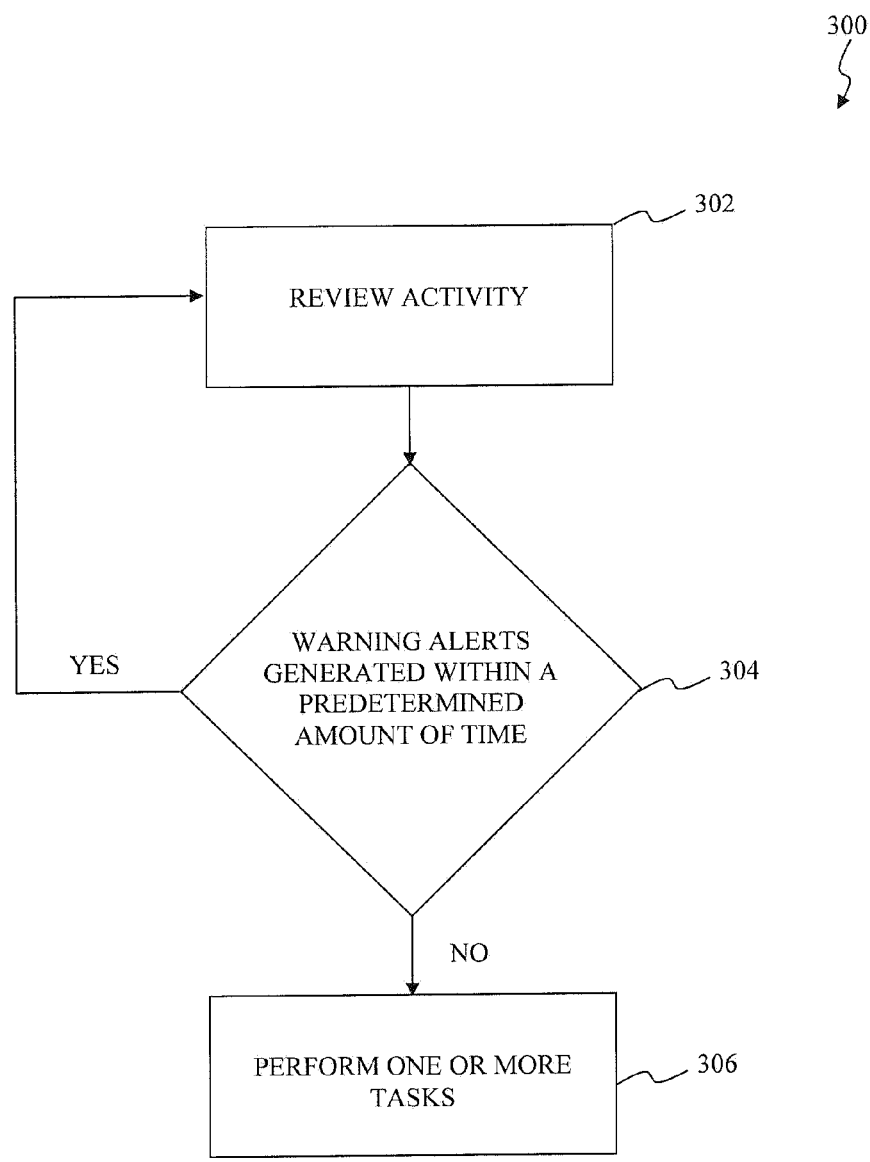
FIG. 3 is a flowchart of exemplary operational steps for the exemplary operation center according to an embodiment of the present disclosure.

FIG. 3 is a flowchart of exemplary operational steps for the exemplary operation center according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for a monitoring center, such as monitoring center 200 to provide an example, in monitoring the text information, the audio, and/or the video information of the activity.

At step 302, the operational control flow 300 reviews text, audio, and/or video information relating to the activity for the suspicious activity and/or the prohibited activity. Typically, the operational control flow 300 generate one or more manual warning alerts, such as an annotation, a flag, a bookmark, an audible alert, and/or a video alert to provide some examples, when the suspicious activity and/or the prohibited activity is present within the activity. The simplest warning alerts can include one or more annotations of the suspicious activity and/or the prohibited activity, although warning alerts of much greater complexity can be used, such notifying the local, the state, and/or the national governing authorities of the suspicious activity and/or the prohibited activity to provide an example, without departing from the spirit and scope of the present disclosure.

At step 304, the operational control flow 300 determines whether the one or more manual warning alerts have been generated in step 302 within a predetermined amount of time. The operational control flow 300 proceeds to step 306 to verify a monitoring person is attentive and reviewing the text, the audio, and/or the video information when the one or more manual warning alerts have not been generated in step 302 within the predetermined amount of time. Otherwise, the operational control flow 300 reverts to step 302 to continue reviewing the text, the audio, and/or the video information.

At step 306, the operational control flow 300 requires the monitoring person to perform one or more tasks to verify the monitoring person is attentive and reviewing the activity. The one or more tasks can be as simple as activating a checkbox or providing a code or an electronic signature to provide some examples, although more complicated tasks, such as a biometric verification such as a retinal, a facial, and/or a voice verification to provide some examples, are possible as will be recognized by those skilled in the relevant art(s) without departing from the spirit and scope of the present disclosure.

Exemplary Computer System for Implementing the Exemplary Design Environment

Figure 4:
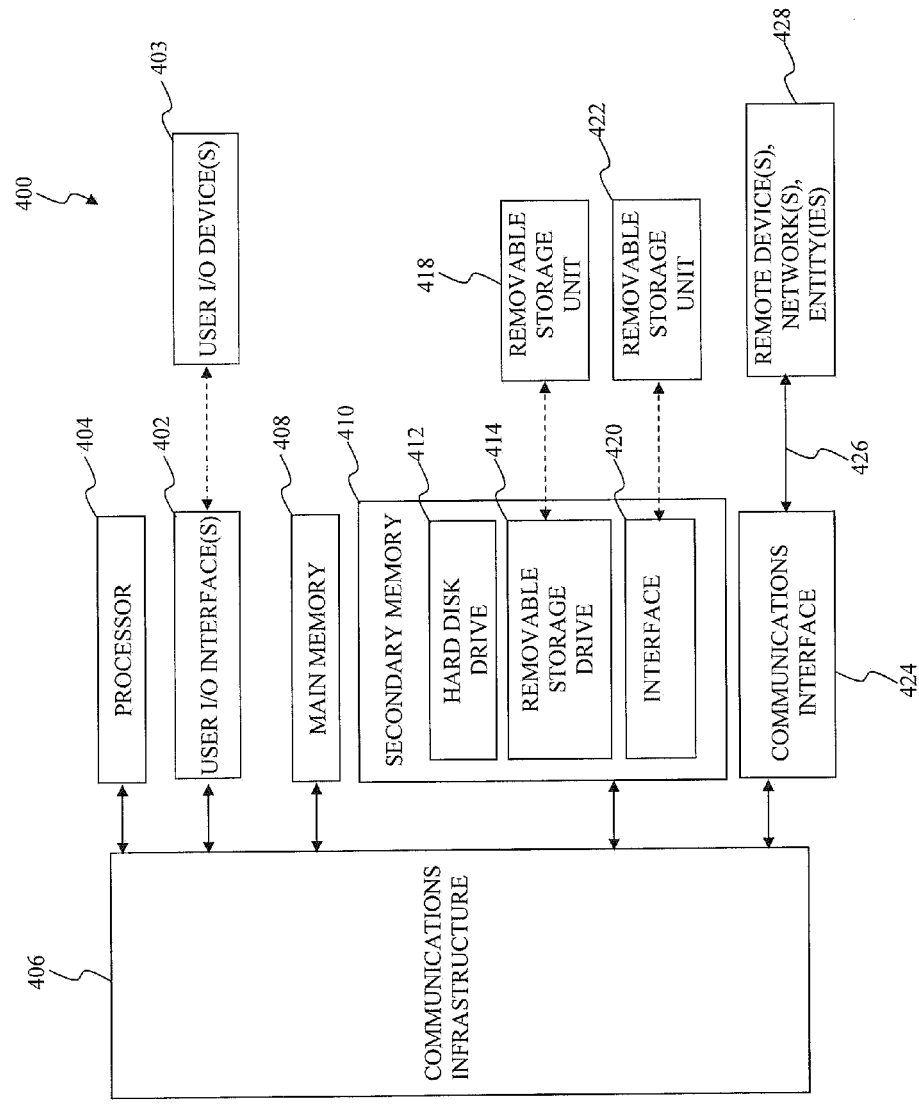
FIG. 4 illustrates a block diagram of an exemplary computer system for implementing the exemplary design environment according to an exemplary embodiment of the present disclosure.

FIG. 4 illustrates a block diagram of an exemplary computer system for implementing the exemplary design environment according to an exemplary embodiment of the present disclosure. A computer system 400 can be used to implement the monitoring server 202, the monitoring storage 204, the monitoring stations 206.1 through 206.n, and the administrative station 208 as described above in FIG. 2. After reading this description, it will become apparent to a person skilled in the relevant art how to implement embodiments using other computer systems and/or computer architectures.

The computer system 400 includes one or more processors 404, also referred to as central processing units, or CPUs, to execute operations of the monitoring server 202, the monitoring storage 204, the monitoring stations 206.1 through 206.n, and the administrative station 208 as described above in FIG. 2. The one or more processors 404 can be connected to a communication infrastructure or bus 406. In an exemplary embodiment, one or more of the one or more processors 404 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 400 also includes user input/output device(s) 403, such as monitors, keyboards, pointing devices, etc., which communicate with communication infrastructure 406 through user input/output interface(s) 402.

The computer system 400 also includes a main or primary memory 408, such as a random-access memory (RAM) to provide an example. The main memory 408 can include one or more levels of cache. The main memory 408 has stored therein control logic (i.e., computer software) and/or data, to perform operations of the monitoring server 202, the monitoring storage 204, the monitoring stations 206.1 through 206.n, and the administrative station 208 as described above in FIG. 2

The computer system 400 can also include one or more secondary storage devices or memory 410 to store data for performing operations of the monitoring server 202, the monitoring storage 204, the monitoring stations 206.1 through 206.n, and the administrative station 208 as described above in FIG. 2. The one or more secondary storage devices or memory 410 can include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive. The removable storage drive 414 may interact with a removable storage unit 418. The removable storage unit 418 includes a computer usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 reads from and/or writes to removable storage unit 418 in a well-known manner.

According to an exemplary embodiment, the one or more secondary storage devices or memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication or network interface 424 enables the computer system 400 to communicate and interact with any combination of remote devices, remote networks, remote entities, etc. (individually and collectively referenced by reference number 428). For example, the communication or network interface 424 may allow the computer system 400 to communicate with the remote devices 428 over a communication path 426, which may be wired and/or wireless, and which may include any combination of LANs, WANs, the Internet, etc. Control logic and/or data may be transmitted to and from the computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that illustrated in FIG. 4. In particular, embodiments may operate with software, hardware, and/or operating system implementations other than those described herein.

CONCLUSION

The Detailed Description referred to accompanying figures to illustrate exemplary embodiments consistent with the disclosure. References in the disclosure to "an exemplary embodiment" indicates that the exemplary embodiment described include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional non-building blocks illustrating the implementation of specified functions and relationships thereof. The boundaries of these functional non-building blocks have been arbitrarily defined herein for the convenience of the description. Alternate boundaries can be defined so long as the specified functions and relationships thereof are appropriately performed.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based on the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A monitoring station for monitoring a review of a data communication from an insider person within a controlled environment, the monitoring station comprising:
   a memory storage device configured to store text information corresponding to the data communication; and
   at least one processor, associated with the memory storage device, configured to:
      monitor whether a warning alert relating to the text information has been received from a monitoring person at the monitoring station during a predetermined amount of time; and
      instruct the monitoring person to perform a task to determine whether the monitoring person is monitoring the text information when the warning alert has not been received from the monitoring person during the predetermined amount of time.

2. The monitoring station of claim 1, wherein the data communication is between the insider person within the controlled environment and an outsider person within an uncontrolled environment remote from the controlled environment.

3. The monitoring station of claim 1, wherein the data communication is between the insider person within the controlled environment and a second insider person within the controlled environment.

4. The monitoring station of claim 1, wherein the data communication comprises:
   a text message; or
   an electronic mail message.

5. The monitoring station of claim 1, wherein the at least one processor is further configured to generate the warning alert when the monitoring person indicates suspicious activity or prohibited activity is present in the text information.

6. The monitoring station of claim 5, wherein the warning alert comprises:
   an annotation, a flag, a bookmark, an audible alert, and/or a video alert indicating presence of the suspicious activity or prohibited activity in the text information.

7. The monitoring station of claim 1, wherein the task comprises:
   entry of a response to a question by the monitoring person at the monitoring station;
   entry of a code by the monitoring person at the monitoring station; or
   entry of a biometric verification by the monitoring person at the monitoring station.

8. The monitoring station of claim 1, wherein the at least one processor is further configured to receive a monitoring schedule, the monitoring schedule including a designation of the monitoring person from among a plurality of monitoring persons or the monitoring station from among a plurality of monitoring stations to review the text information.

9. A monitoring station for monitoring a review of a video communication from an insider person within a controlled environment, the monitoring station comprising:
   a memory storage device configured to store video information corresponding to the video communication; and
   at least one processor, associated with the memory storage device, configured to:
      monitor whether a warning alert relating to the video information has been received from a monitoring person at the monitoring station during a predetermined amount of time; and
      instruct the monitoring person to perform a task to determine whether the monitoring person is monitoring the video information when the warning alert has not been received from the monitoring person during the predetermined amount of time.

10. The monitoring station of claim 9, wherein the video communication is between the insider person within the controlled environment and an outsider person within an uncontrolled environment remote from the controlled environment.

11. The monitoring station of claim 9, wherein the video communication is between the insider person within the controlled environment and a second insider person within the controlled environment.

12. The monitoring station of claim 9, wherein the video communication comprises:
a video conference.

13. The monitoring station of claim 9, wherein the at least one processor is further configured to generate the warning alert when the monitoring person indicates suspicious activity or prohibited activity is present in the video information.

14. The monitoring station of claim 13, wherein the warning alert comprises:
an annotation, a flag, a bookmark, an audible alert, and/or a video alert indicating presence of the suspicious activity or prohibited activity in the video information.

15. The monitoring station of claim 9, wherein the task comprises:
entry of a response to a question by the monitoring person at the monitoring station;
entry of a code by the monitoring person at the monitoring station; or
entry of a biometric verification by the monitoring person at the monitoring station.

16. The monitoring station of claim 15, wherein the biometric verification comprises:
retinal verification data;
facial verification data; or
voice verification data.

17. The monitoring station of claim 9, wherein the at least one processor is further configured to receive a monitoring schedule, the monitoring schedule including a designation of the monitoring person from among a plurality of monitoring persons or the monitoring station from among a plurality of monitoring stations to review the text information.

18. A monitoring station for monitoring a review of a non-communication related activity within a controlled environment, the monitoring station comprising:
a memory storage device configured to store text, audio, and/or video information corresponding to the non-communication related activity; and
at least one processor, associated with the memory storage device, configured to:
monitor whether a warning alert relating to the text, the audio, and/or the video information has been received from a monitoring person at the monitoring station during a predetermined amount of time; and
instruct the monitoring person to perform a task to determine whether the monitoring person is monitoring the text, the audio, and/or the video information when the warning alert has not been received from the monitoring person during the predetermined amount of time.

19. The monitoring station of claim 18, wherein the at least one processor is further configured to generate the warning alert when the monitoring person indicates suspicious activity or prohibited activity is present in the text, the audio, and/or the video information.

20. The monitoring station of claim 19, wherein the warning alert comprises:
an annotation, a flag, a bookmark, an audible alert, and/or a video alert indicating presence of the suspicious activity or prohibited activity in the text, the audio, and/or the video information.

21. The monitoring station of claim 18, wherein the task comprises:
entry of a response to a question by the monitoring person at the monitoring station;
entry of a code by the monitoring person at the monitoring station; or
entry of a biometric verification by the monitoring person at the monitoring station.

22. The monitoring station of claim 21, wherein the biometric verification comprises:
retinal verification data;
facial verification data; or
voice verification data.

23. The monitoring station of claim 18, wherein the at least one processor is further configured to receive a monitoring schedule, the monitoring schedule including a designation of the monitoring person from among a plurality of monitoring persons or the monitoring station from among a plurality of monitoring stations to review the text information.

24. The monitoring station of claim 18, wherein the non-communication related activity comprises:
movement of an insider person within the controlled environment;
a visitation between the insider person within the controlled environment and an outsider person from an uncontrolled environment remote from the controlled environment;
exercising activity of the insider person within the controlled environment;
leisure time activity of the insider person within the controlled environment;
mealtime activity of the insider person within the controlled environment;
educational activity of the insider person within the controlled environment; or
employment activity of the insider person within the controlled environment.

* * * * *